United States Patent

Seo

[11] Patent Number: 5,180,454
[45] Date of Patent: Jan. 19, 1993

[54] ANTI-SKID TIRE APPARATUS

[76] Inventor: Jung-Yoon Seo, 383-9 Pukkajwa-1-dong, Seodaemun-ku, Seoul, Rep. of Korea

[21] Appl. No.: 584,658

[22] Filed: Sep. 19, 1990

[51] Int. Cl.⁵ .............................. B60C 27/20
[52] U.S. Cl. .................. 152/229; 152/213 A; 152/179
[58] Field of Search ............. 152/167, 170, 171, 172, 152/173, 174, 175, 178, 179, 180, 181, 182, 183, 184, 185, 187, 190, 191, 208, 213 A, 213 R, 226, 225 R

[56] References Cited

U.S. PATENT DOCUMENTS

| 775,722 | 11/1904 | Faison | 152/178 |
| 1,468,643 | 9/1923 | McDonald | 152/178 |
| 2,046,159 | 6/1936 | Gottlieb | 152/191 |

FOREIGN PATENT DOCUMENTS

| 501553 | 7/1930 | Fed. Rep. of Germany | 152/225 R |
| 283623 | 10/1952 | Italy | 152/226 |

Primary Examiner—Michael W. Ball
Assistant Examiner—Francis J. Lorin
Attorney, Agent, or Firm—Finnegan, Henderson, Farabow, Garrett and Dunner

[57] ABSTRACT

An anti-skid tire apparatus includes a cover structure having a plurality of sections, each of the sections having an outer tread surface, the each section having internal and external sidewalls, the external sidewall having a plurality of fastening slots, the outer tread surface having a plurality of grooves, the grooves having a first plurality of apertures, a plurality of cleats each having a plurality of jagged edges, the cleats being permanently affixed in the first plurality of apertures at fixed intervals along the outer tread surface of the sections, a plurality of straps affixed onto the plurality of fastening slots, a belt passing through the plurality of straps, the belt having a belt buckle to fasten ends of the belt, and a connecting hook and an eyelet located at the internal sidewall of each section, the connecting hook and the eyelet fastening the sections together.

5 Claims, 4 Drawing Sheets

ANTI-SKID TIRE APPARATUS

BACKGROUND OF THE INVENTION

The present invention relates to an anti-skid tire apparatus. More particularly, the invention relates to an anti-skid tire apparatus attached to a tire which is effective in preventing slipping and skidding as well as improving traction and motor vehicle control on icy roads.

Objects of the invention are to provide an anti-skid tire apparatus of simple structure, which is inexpensive to manufacture, installed and detached with ease and convenience on new and existing motor vehicle tires, and which functions efficiently, effectively and reliably to prevent the motor vehicles from slipping while in operation on snow-covered or icy roads.

Conventional snow tires are being widely used but they do not necessarily fulfill the role of preventing motor vehicles from slipping and skidding on snow-covered or icy roads and frequently cause traffic jams.

Generally, metal chains are utilized on tires so as to provide an improved stability of motor vehicle control on icy roads. Nonetheless, such metal chains not only produce excessive noise but also cause damage to road surfaces, particularly paved roads.

The only prior art disclosure which deals in any way with the avoidance of slipping is found in Japanese Utility Model Publication No. 51-100402 in which a belt comprised of rubber studs is installed on the tire tread and fastened to the rim of the wheel by means of hooks.

The disadvantage associated with the cited invention is that numerous hooks must be individually fastened in order to install and remove the belt on the tire tread which is a quite bulky and time consuming process.

The present invention has been made essentially in an attempt to overcome the above-mentioned problems, and it is an object of the present invention to provide a novel anti-skid apparatus comprised of a cover structure having jagged U-shaped cleats secured so as to maximize the effect of preventing the tires from slipping and skidding, avoid any damage to the pavement, and install and detach easily and conveniently.

DETAILED DESCRIPTION OF THE PREFERRED EMBODIMENT

The present invention will now be explained in detail by way of a preferred embodiment therein with reference to the accompanying drawings.

Figure 1:
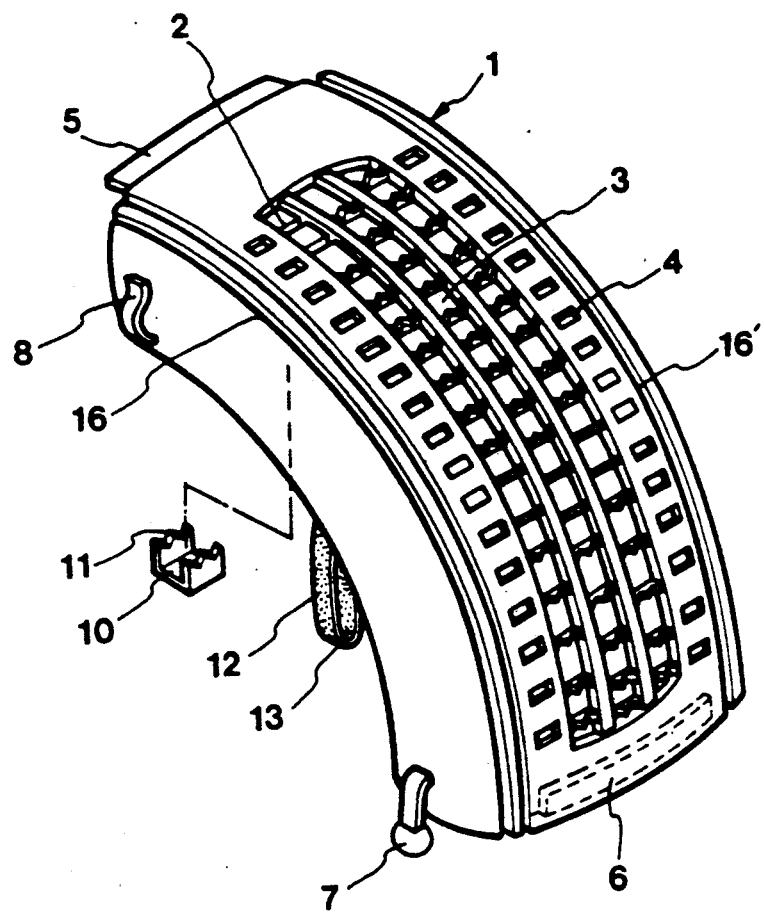
FIG. 1 is a quarter section view of the anti-skid tire apparatus according to a preferred embodiment of the present invention.
Figure 2:
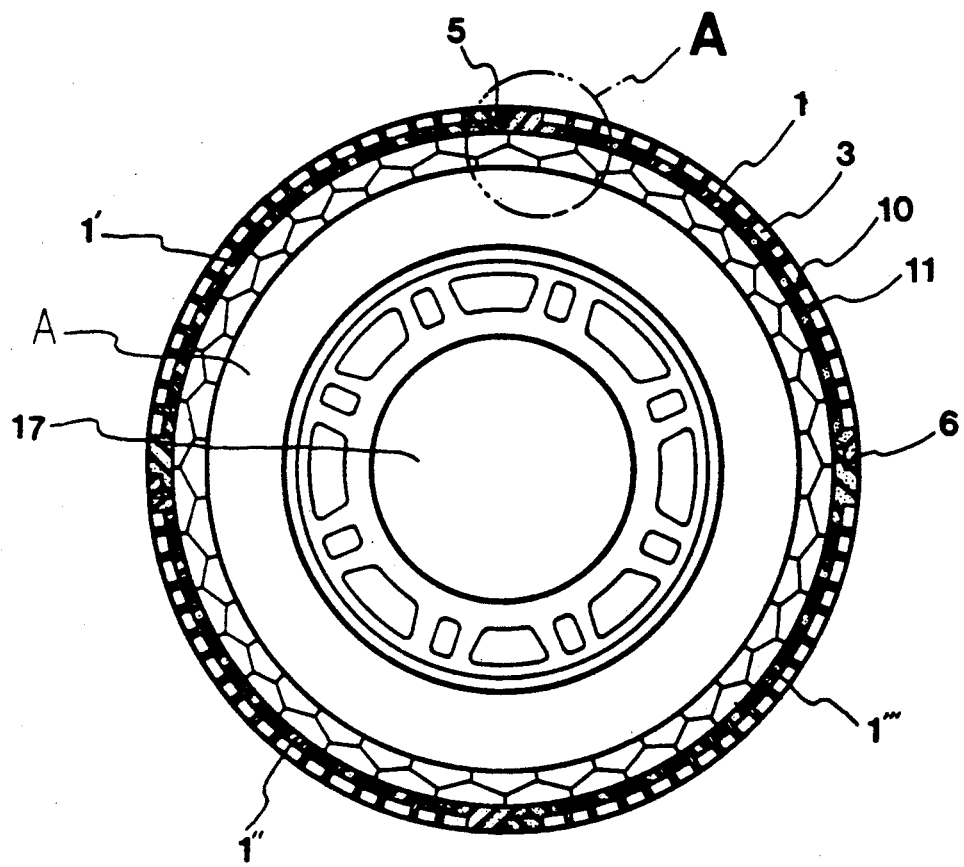
FIG. 2 is a longitudinal cross-sectional view showing the anti-skid tire apparatus of the present invention in place on a tire.
Figure 3:
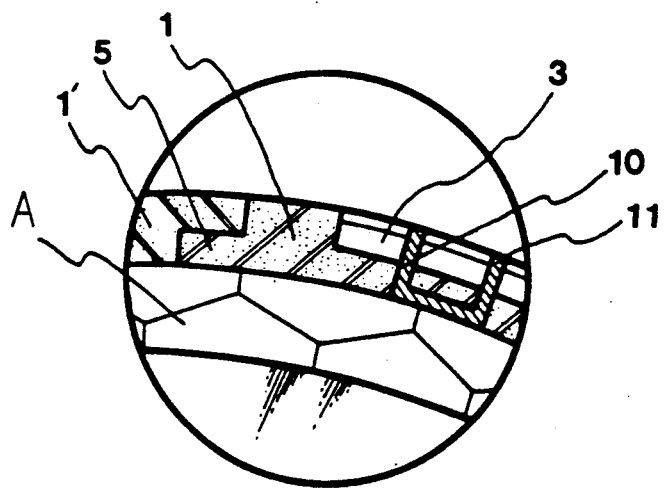
FIG. 3 is an enlarged fragmentary cross sectional view showing a part of the tire-skid proof apparatus illustrated in FIG. 1 and the portion encircled A in FIG. 2.

FIG. 1 shows a quarter section of a rubber cover structure 1, and FIG. 2 shows a set of four quarter sections 1, 1', 1", and 1"' of the cover structure placed on a tire. The cover structure is provided with grooves 3 and square apertures 4 on an outer tread surface of the cover structure. The grooves 3 and square apertures 4 are provided with a plurality of concave-convex depressions. The cover structure has tracks 16 and 16' along edges of the outer tread surface. An engaging protrusion 5 and a depression 6 are provided at corresponding ends of each section of the cover structure, as shown in FIGS. 1 and 2. Internal sidewalls of the cover structure includes a connecting eyelet 7 and a hook 8.

The external sidewalls of the cover structure include fastening slots 9 (FIG. 5) and rubber looped straps 12 and 13 are sewn onto the fastening slots so as to allow a rubber belt 14 (FIG. 5) with a buckle 15, 15' to pass through.

"U"-shaped cleats 10 with jagged edges 11 are permanently affixed on apertures 2 in the grooves 3 at fixed intervals along the outer tread surface of each section of the cover structure.

Figure 4:
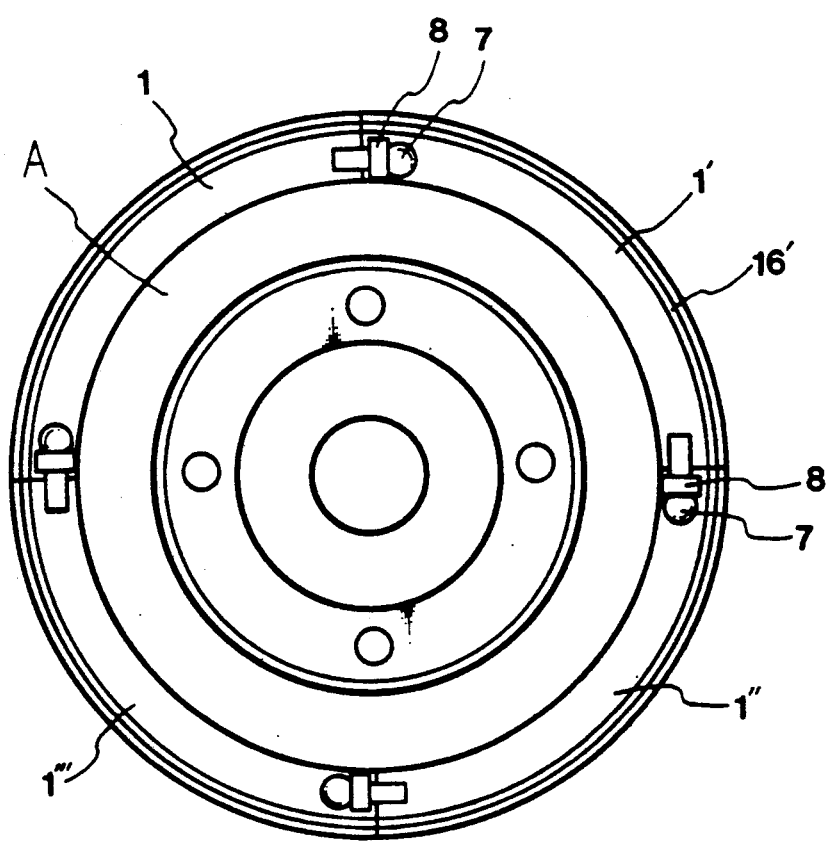
FIG. 4 is a view facing the internal sidewall showing the anti-skid tire apparatus of the present invention in place on a tire.
Figure 5:
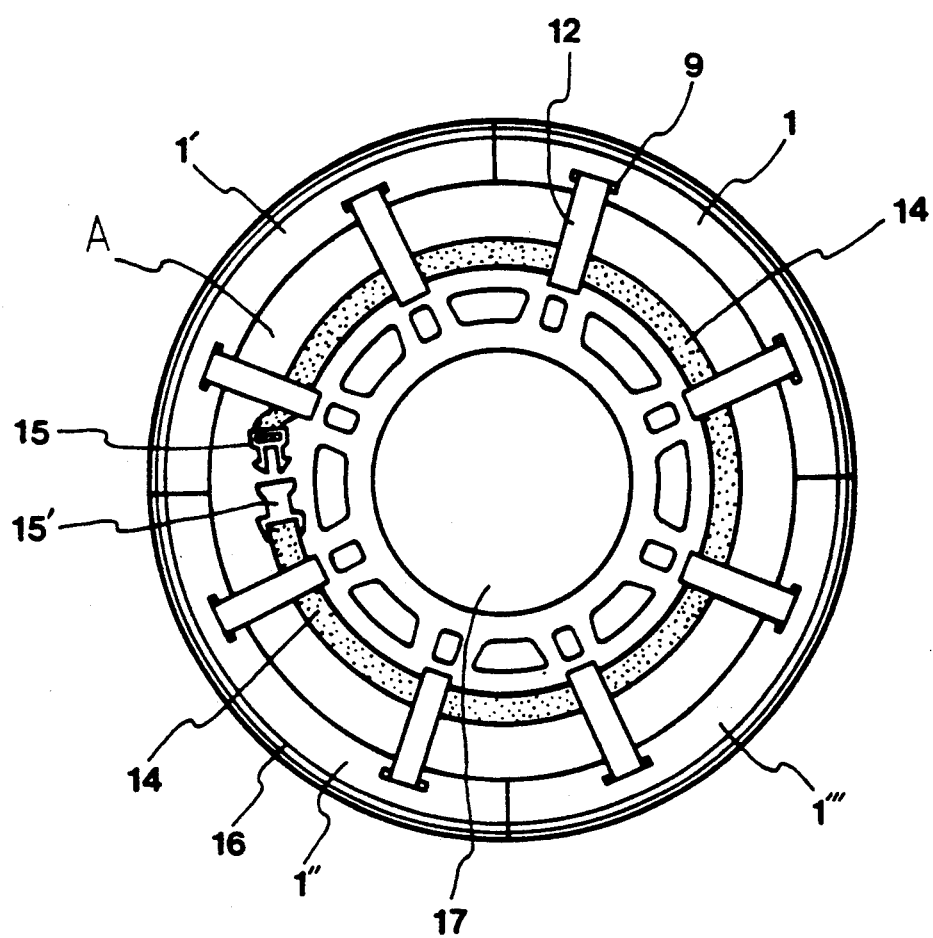
FIG. 5 is a view facing the external sidewall showing the anti-skid tire apparatus of the present invention in place on a tire.

The set of four quarter sections of the rubber cover structure 1, 1', 1", and 1"' placed on the tire are connected by the protrusions 5 and depressions 6 located at corresponding ends of each quarter section of the cover structure 1, 1', 1", and 1"' as illustrated in FIG. 4. The quarter sections are tightly fastened by a rubber strap 14 having a buckle 15 and 15' on its two loose ends as shown in FIG. 5 and interlocked with a connecting eyelet 7.

Although there are "U"-shaped cleats 10 with jagged edges 11 that are permanently affixed on apertures 2 in the grooves 3 at fixed intervals along the outer tread surface of the rubber cover structure 1, 1', 1", and 1"', the protrusions of jagged edges 11 are uniformly provided not to protrude beyond the height of the grooves 3 thereby avoiding any damage to the pavement.

What is claimed is:

1. An anti-skid tire apparatus to be installed on a tire comprising:
    a cover structure having a plurality of sections, each of said sections having an outer tread surface, said each section having an internal sidewall and an external sidewall having a plurality of fastening slots, each said outer tread surface having a plurality of grooves, said grooves having a first plurality of apertures;
    a plurality of cleats having a plurality of jagged edges, said cleats being permanently affixed in said first plurality of apertures at fixed intervals along said outer tread surface of said sections;
    a plurality of straps affixed onto said plurality of fastening slots;
    a belt passing through said plurality of straps, said belt having a belt buckle to fasten ends of said belt; and
    means on the internal sidewall for fastening said sections of said cover structure together said fastening means including a connecting hook and an eyelet.

2. An anti-skid tire apparatus according to claim 1, wherein each of said sections of said cover structure includes a protrusion extending from one end of each said section and a depression located at another end of each said section, said protrusion and said depression connecting said sections together to substantially cover the tire entirely.

3. An anti-skid tire apparatus according to claim 1, wherein each of said outer tread surface of each said section includes tracks along edges of the outer tread surface and a second plurality of apertures.

4. An anti-skid tire apparatus according to claim 1, wherein said cover structure has four sections.

5. An anti-skid tire apparatus according to claim 1, wherein said belt and straps are made of rubber.

* * * * *